United States Patent [19]
Rivera-Bottzeck

[11] Patent Number: 5,346,453
[45] Date of Patent: Sep. 13, 1994

[54] MULTIPLE BIT POWER DRILL

[76] Inventor: Otto Rivera-Bottzeck, 312 Wright St., Apt. 106, Lakewood, Colo. 80228

[21] Appl. No.: 105,113

[22] Filed: Aug. 12, 1993

[51] Int. Cl.$^5$ .................... B23Q 3/157; B23B 45/00
[52] U.S. Cl. ................................ 483/1; 279/902; 408/1 R; 408/35; 483/51
[58] Field of Search ................ 408/35, 241 R, 1 R; 483/51, 57, 1; 279/902; 81/437, 439

[56] References Cited
U.S. PATENT DOCUMENTS

| | | | |
|---|---|---|---|
| 1,022,711 | 4/1912 | Sweet | 408/241 R |
| 2,679,770 | 6/1954 | Carter et al. | 408/241 R |
| 4,536,113 | 8/1985 | Hatfield | 279/902 |
| 4,604,005 | 8/1986 | Russ | 408/241 R |
| 4,928,381 | 5/1990 | Yaguchi et al. | 408/35 |
| 5,022,131 | 6/1991 | Hobbs | 408/35 |
| 5,065,498 | 11/1991 | McKenzie | 408/35 |

FOREIGN PATENT DOCUMENTS
1073681  6/1967  United Kingdom ................ 408/35

Primary Examiner—Daniel W. Howell
Attorney, Agent, or Firm—Charles C. Corbin

[57] ABSTRACT

Disclosed is a portable electric power drill having a rotatable cylindrical magazine within the drill housing for storing a tool bit element in each of its plural bores, the magazine being rotatable to bring a selected magazine bore in alignment with the central bore of a chuck assembly at the front of the drill. A flexible cable is slidable by hand between forward and rearward positions to eject a tool bit element from the magazine to the chuck and to return a tool bit from the chuck to the magazine, and the drill includes mechanism to allow the chuck to be tightened and loosened without the use of a chuck key, or without having to otherwise manually grasp the chuck or associated rotatable parts.

18 Claims, 2 Drawing Sheets

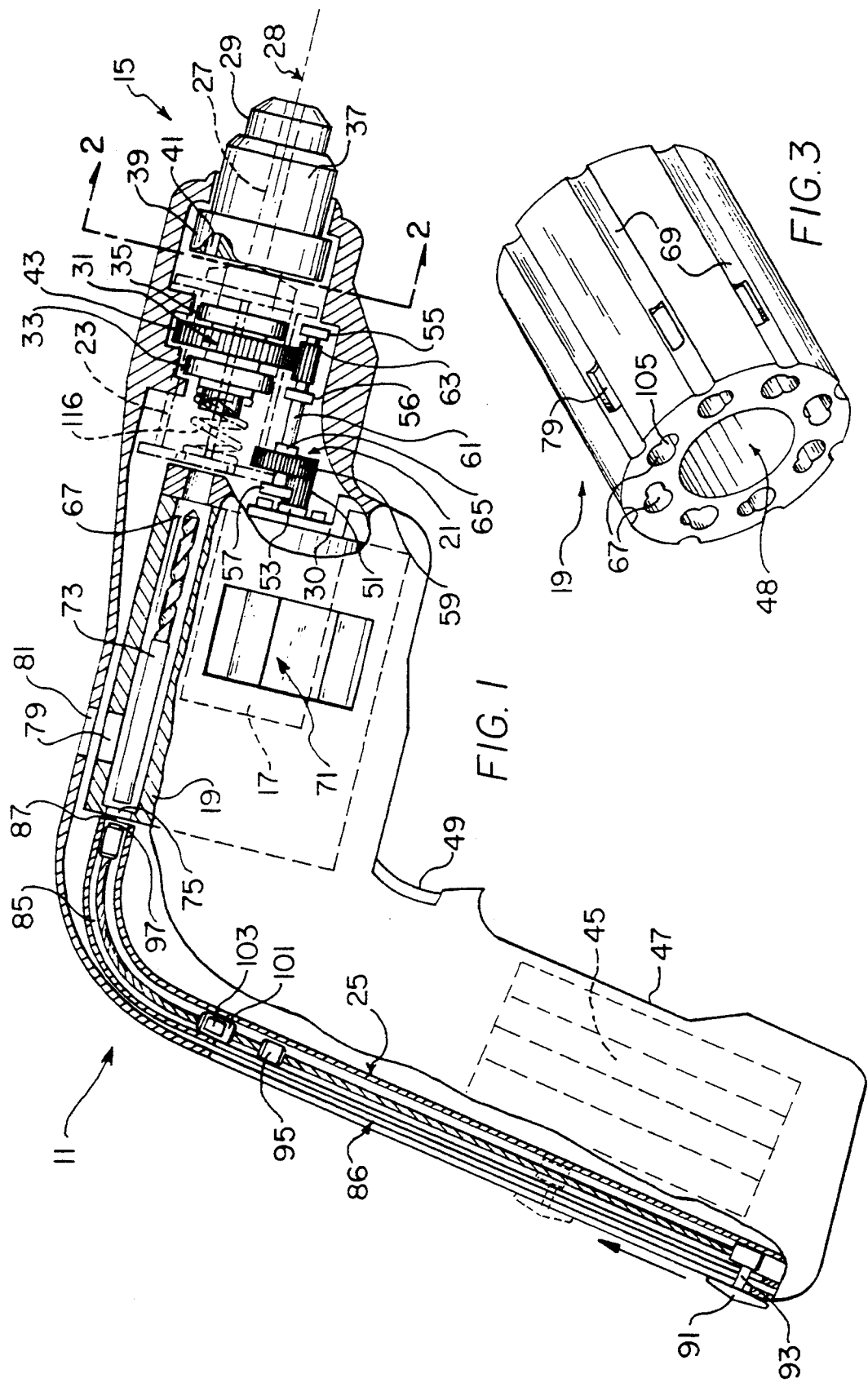

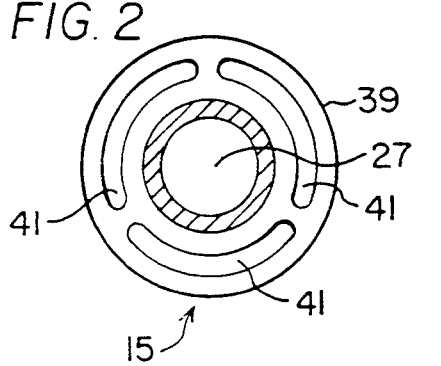
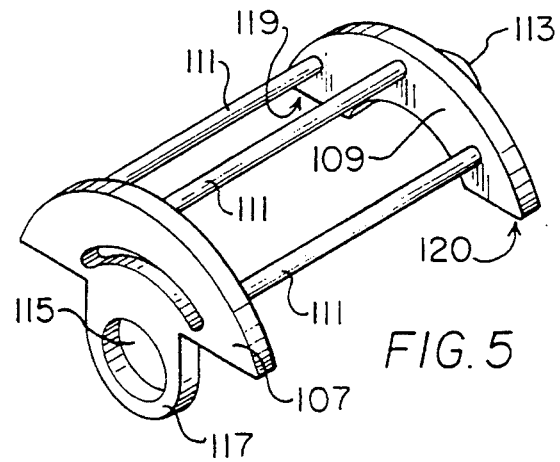
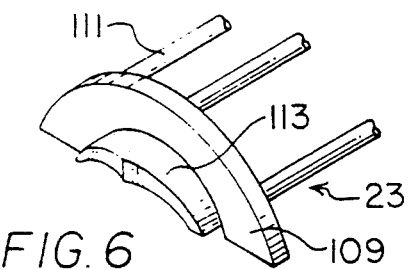
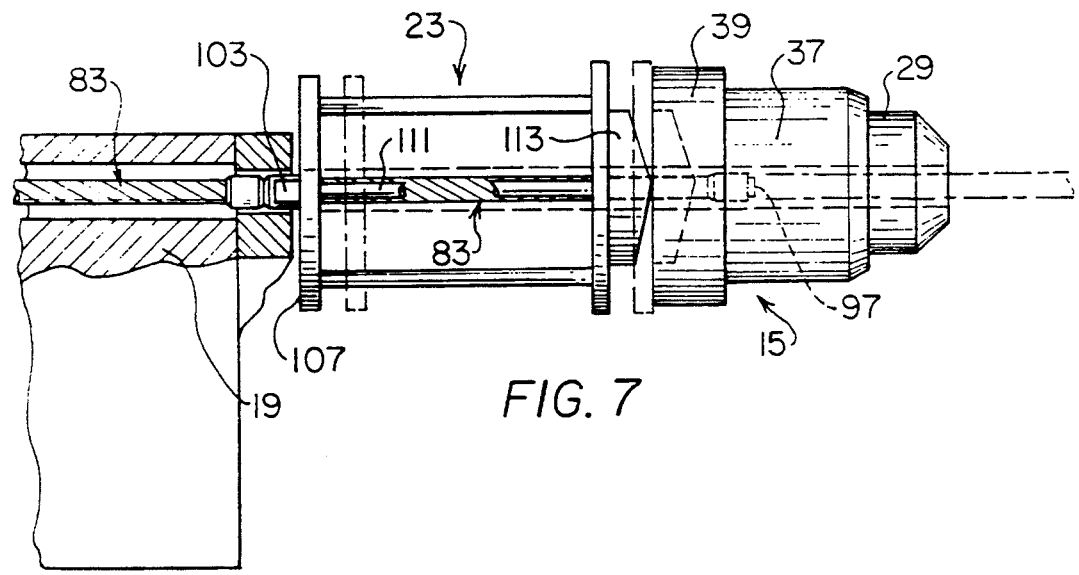
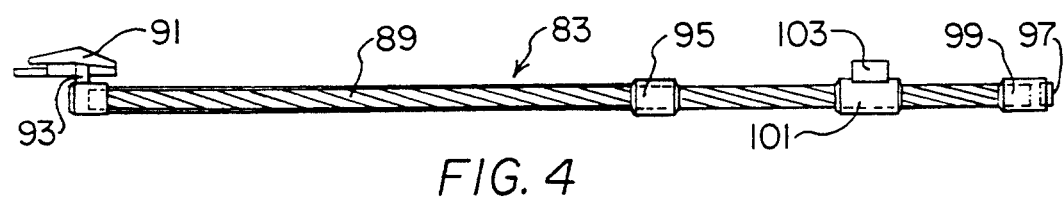

MULTIPLE BIT POWER DRILL

BACKGROUND OF THE INVENTION

1. Field of the Invention

The present invention relates generally to power drills that can selectively drive any of a number of plural bits carried by the drill. More particularly, the present invention relates to hand-held power drills that can load and retract in a common chuck, selected ones of rotary tool bits stored in a rotatable magazine within the drill housing.

2. Description of the Prior Art

While the conventional power drill has been a simple, practical and effective tool in many respects, it is apparent that where productivity is of a prime concern, such as in production work and construction, the changing of tool bits can be time consumptive and costly. The conventional portable power drill typically has a three jaw chuck assembly in which a selected tool bit can be mounted and removed manually by using a chuck key. It was recognized that an appreciable amount of time can be extended in the steps of locating the appropriate chuck key, loosening the chuck, removing the tool bit and finding the desired replacement bit, inserting it in the chuck and tightening the chuck, and then perhaps returning the replaced drill bit and the chuck key to storage. The alternative of having more than one power drill, each mounting a different tool bit, has proven to be expensive. Even with the development of keyless chucks where no key is necessary to operate the chuck jaws, it is noted that one must still manually grasp the chuck.

U.S. Pat. No. 2,303,565 to Luna is an example of an early attempt to alleviate this problem. Here, a plural chuck head assembly is mounted at the front of a drill, and is shiftable about a transverse axis to bring a selected chuck head into drive connection with the output shaft of an electric drive. While this arrangement theoretically decreased the time for tool selection and changing, it is apparent that in a practical sense the design will be limited to two or three such chuck heads. Furthermore, it remains necessary for a chuck key to be used for these chuck heads.

Later on there developed power drills with true multi-bit capability, the basic concept of which is exemplified by the device of U.S. Pat. No. 2,679,770 to Carter et al. which employed a multi-chambered cylinder assembly attached to the front of a drill, each chamber having a tool holder for a tool bit of a different size or type. The cylindrical magazine is rotatable about a longitudinal axis to bring a selected tool bit holder in alignment with an axial driving shaft that can be coupled with the selected holder. Efforts at improving upon this configuration of the multiple bit drill were seen in U.S. Pat. No. 5,022,131 to Hobbs and British Patent 1,073,681. Unfortunately these drills suffered from, among other things, alignment problems, and problems stemming from exposure of the cylindrical magazine to dust and other contaminants commonly found in the work environment. A somewhat different approach was tried in McKinze, U.S. Pat. No. 5,065,498. Here a cylindrical magazine was enclosed within the drill housing, and mounted to the rear of a common chuck assembly, a single bit being selectable and advanced within the chuck using a bolt action. A bit is removed from the chuck by retraction of the bolt, however, like the standard drill, a chuck key is required to loosen and tighten the chuck assembly using of this device. This line of development has led to the automated feeding system shown in U.S. Pat. No. 4,604,005 to Russ. Unfortunately such a drill is complex, and would be expensive to fabricate, and is over reliant on its electrically powered key components such as plural electric clutches, load switch and indicator lights, for instance.

SUMMARY OF THE INVENTION

In view of the foregoing, it is a general object of the present invention to provide an improved hand held power drill having multi-bit selection from an assortment of internally stored bits.

A more particular object of the invention is to provide such a drill that has the capability of tightening and loosening its chuck assembly without the use of a chuck key or having to grasp the chuck by hand.

Another object of the invention is to provide a multi-bit power drill that is non-complex and that employs simple, yet effective and reliable mechanical mechanisms.

Yet another object of the invention is to provide such a power drill that lends itself to a cordless design, powered by a battery pack.

A further object of the present invention is to provide such a drill that advantageously employs magnetic force as a bit-retracting means.

Yet a further object of the invention is to provide a multi-bit power drill that is not expensive to fabricate.

These, and other objects and advantages are achievable by the present invention of a multiple bit power drill that includes housing having a handle, a central portion and a forward portion, a chuck assembly being rotatably mounted to the housing forward portion, and having a central bore for receiving a bit element, and a rotatable sleeve for controlling jaws for grasping a bit. Within the housing central portion there is mounted a reversible motor having a longitudinally extending output shaft. A slip clutch is disposed in drive relationship between the drive motor and the chuck assembly and is adapted to slip in its drive relationship when a predetermined amount of driving torque is experienced. A cylindrical magazine has a plurality of longitudinal bores for storing bit elements, and is manually rotatable about the same longitudinal axis as the motor output shaft so as to bring any one of its bores into alignment with the central bore of the chuck assembly, as required. The invention includes locking means mounted for sliding movement from a first position to which it is biased by a spring, to a forward position in which it releasably engages the chuck assembly sleeve to hold the sleeve against rotation. Finally the invention features a flexible cable-assembly, slidably mounted in a guide channel within the housing, for engaging a bit element and for operating the locking means, the cable assembly adapted for ejecting a bit element from a magazine bore and positioning it in the chuck bore while simultaneously pushing the locking means to its forward position. When the bit element is thusly positioned, the motor can be energized to rotate the chuck assembly in a first direction causing the chuck jaws to clamp the bit element, and in a reverse direction to cause the jaws to unclamp the bit element. This cable assembly is also adapted to return a bit element from the chuck bore to a magazine bore, and has a retracted position in which the magazine is free to rotate. In a preferred embodiment of the invention the guide channel for the cable has an elongated slot opening to the outside of the housing, and through which slot projects a push knob from the rear of the cable, for operating the cable, and the forward end portion of the cable has a first, magnetic member for engaging a tool bit and a second member for engaging the locking means.

BRIEF DESCRIPTION OF THE DRAWINGS

FIG. 1 is a partly sectional side elevational view of the present invention, with portions partially cut away for the sake of clarity;

FIG. 2 is a sectional view taken along the line 2—2 of FIG. 1;

FIG. 3 is a perspective view of the bit-holding magazine used in the invention;

FIG. 4 is a side elevational view, in isolation, of the loading end retracting cable;

FIG. 5 is a perspective view, in isolation, of the locking cage; and

FIG. 6 is partial, side elevational view with parts removed for the sake of clarity for illustrating operation of the locking cage.

DETAILED DESCRIPTION OF THE INVENTION

Referring now to the drawings, FIG. 1 shows that the main components of a multi-bit power drill 11 according to the present invention includes housing 13, a chuck assembly 15, an electric motor 17, a cylindrical magazine 19, a slip clutch assembly 21, a locking cage 23, and a loading and retracting cable assembly 25.

Housing 13 is preferably fabricated of a suitably durable and strong polymeric material, and is in the form of two half shells that are appropriately molded and shaped internally to accommodate and support the various invention components, and secured to each other by suitably fastening means. At the front of housing 13 is mounted the chuck assembly 15 that has a bore 27 for receiving a tool bit and an inner sleeve 29 that mounts a conventional three jaw clamp, the rear end of chuck sleeve 29 being affixed to a hub gear assembly 31 that is in turn rotatably mounted to the housing 13 by bushings 33 and 35. Note that the gear assembly 31 has a through-bore that is designed to pass a tool bit and that is aligned with the chuck bore. Chuck assembly 15 additionally comprises an outer sleeve 37, which, in the manner of conventional chucks, is rotatable relative to the inner sleeve 29 to operate the chuck clamping jaws (not shown). The rear end of chuck assembly 15 has a stop plate 39 and, as shown in FIG. 2, is characterized by locking recesses 41 which are designed to be releasably engaged, in a manner that will be described hereinafter, by the locking cage 23 to hold the chuck outer sleeve 37 against rotation. The hub gear assembly 31 includes gear 43.

A reversible electric motor 17 is energized by a conventional battery pack 45 mounted within handle 47, and controlled by trigger switch 49, and has a longitudinally extending output shaft 53 that carries a drive gear 51. In a uniquely compact arrangement, motor 17 is substantially received within the cylindrical core of the magazine 19 which it helps support for rotation, and which will be subsequently described. Motor 17 is firmly secured in place by way of a mounting bracket 30. Motor 17 will drive the chuck assembly 15 in rotation by way of the slip clutch assembly 21 and associated gear reduction arrangement. The slip clutch assembly is supported for rotation in bushings 55, 56, and 57, and the motor output gear 51 meshes with the clutch input gear 59 which will ordinarily allow rotation of shaft 61 and the clutch output gear 63. Note that the clutch output gear 63 will turn the hub gear 43 so as to rotate the chuck assembly 15. The clutch assembly 21 is of a conventional design and includes a slip plate arrangement 65 that is designed to allow the input end of the clutch assembly to slip out of drive relationship with the output end when resistance to turning exceeds a certain predetermined level. When this occurs, the clutch input gear 59 is allowed to continue to rotate as the output gear 63 is held against turning. It will be appreciated that, when the chuck outer sleeve 39 is held stationary while the remainder of the chuck assembly is rotated, the jaws of the chuck will be caused to be tightened upon a tool bit disposed within the chuck bore.

The locking cage is designed to be used to releasably hold the chuck outer sleeve 37 in a manner that will be explained, and the clutch is designed to slip when a tool bit is tightened with a force sufficient for the task, the tool bit being clamped not too loosely as to slip within the jaws, and not tighter than necessary.

Having described the mechanism for driving the chuck assembly 15, the invention's unique and advantageous mechanism for feeding and retracting selected tool bits to and from the chuck assembly 15, and the mechanism for releasably holding the chuck assembly against rotation will be discussed. First note that the magazine 19 is rotatably mounted within a shaped cavity in housing 13 and is also supported on the cylindrically shaped motor 17 which is slidably engaged within the cylindrical core of 48 of the magazine. The magazine 19 has a plurality of parallel, longitudinal chambers 67 that are radially equidistant from the axis of magazine 19. FIG. 3 also illustrates magazine 19. FIG. 1 is also illustrative of how the magazine 19 is rotatable to bring any selected chamber 67 into alignment with the axis 28 of the chuck bore, there being means to allow the rotational motion of the magazine to be indexed to hold any given chamber 67 in its aligned position. Note that in the side of housing 13 there is an opening 71 which is sufficiently large to allow the user to touch the knurled outer wall of magazine 19 to rotate the magazine 19. FIG. 1 illustrates how a chamber 67 receives a tool bit 73, the rear end of bit 73 abutting a narrowed portion 75 to limit rearward movement of the bit 73. Note that magazine 19 has a view port 79 associated with each chamber 57, this magazine port being alignable with a view port 81 in the top of the housing, which aligned ports will allow the user to identify the bit 73.

The loading and retracting mechanism 25 features a flexible cable assembly 83, shown in FIGS. 1 and 4, that is designed to be slidably mounted in a guide channel 85 integrally molded in the housing 13 and which extends upwardly along the back side of handle 47 and curves to a longitudinal direction to terminate at an open end 87 that is spaced closely to the rear of the magazine 19, and that is in alignment with the axis 28 of chuck bore. A stranded steel cable 89 has a push knob 91 affixed to its first end by crimping or other suitable means, and when assembly 83 is installed as FIG. 1 shows, the knob connecting web 93 will extend through the slot 86 so that to support the knob 91 at the exterior of the drill housing. A stop 95 is secured to cable 89, and a fairly powerful magnet 97 is secured in an end cap 99. Finally there is a cage-engaging element 101 that has a bore that slidably receives the cable 89, so that it can freely slide along the cable between stop 95 and end cap 99, which components the element 101 will abut. Note that element 101 has a side block 103 having a front face that is designed to make pushing engagement with the locking cage 23 as will be shown. The upper part of cable assembly 83, including magnet 97 and the element 101 are designed to be pushed and pulled through a magazine chamber 67, and FIG. 3 shows how each chamber 67 has a offset part 105 for accommodating the push block 103 and for holding it appropriately aligned for making engagement with locking cage 23 as will now be described.

FIG. 5 shows locking cage 23 to have a front plate 109 and a rear plate 107 that are connected by stringers 111. A locking lip 113 projects forwardly from plate 109 and is shaped and sized to be received in any one of the locking recesses 41 in the rear of the chuck assembly 15, shown in FIG. 1 and FIG. 2. The cage rear plate 107 features a circular opening 115 which is large enough to pass the magnet and cap 99 of the cable 89, but not the push element 101, and the rearward surface 117 is adapted to the abutted by the thrust block 103. The cage 23 is mounted within recesses in housing 13 such that it can slide longitudinally between a rear position, shown in solid lines in FIG. 6, and a forward position illustrated in phantom lines, cage 23 being appropriately restrained against rotational movement. The alignment of cage 23 is such that the locking lip 113 is disposed adjacent the rear end of the chuck assembly and the circular opening 115 is aligned with the longitudinal axis 28 of the chuck bore. A compression spring 116, shown in FIG. 1, extends between the rear of bushing 33 and the front of the cage rear plate 107, and urges cage 23 into its rearward position. Note that the end 119 of cage front plate 109 is designed to abut a shoulder, not shown, in the housing, to hold the cage against rotation in an anti-clockwise direction as viewed in FIG. 5, and the end 120 is similarly designed to abut another shoulder in order to restrain the cage against clockwise rotation.

A greater appreciation of the above described invention will be obtained by the following description of its operation and use.

In order to load the magazine 19 with a tool bit, the cable assembly 25 is fully retracted and the magazine is engaged by hand through the opening 71 and rotated to bring an empty chamber in alignment with the chuck bore axis 28. Then, with the front of the drill raised, and the chuck jaws opened, a tool bit is placed in the open chuck and fed by gravity to the magazine chamber. This procedure can be repeated to fill the magazine with the desired variety of bits.

To select and set a particular tool bit for use, the magazine 19 is rotated to bring the chamber containing the selected tool bit into alignment with the chuck axis, the bit being identified by observing it through the viewport 81. Then the push knob 91 is pushed up to slide the cable from its retracted position to its engaged position. Doing this pushes the bit from the magazine chamber through the circular opening 115 and the bore of gear assembly 31, and into position within the chuck bore 27. Magnetic force holds the tool bit in contact with the tip 97. During the last bit of forward travel of the cable, the locking cage 23 will be engaged by the push block part 107 and urged forward into locking engagement with chuck sleeve 37, in the manner described hereinabove. Trigger switch 49 is then squeezed to energize the motor 17 causing the chuck inner sleeve 29 to be rotated, which in turn causes the chuck jaws to quickly tighten upon the tool bit. The clutch will slip when the tool bit is clamped with the appropriate force. Then the trigger switch 49 and the push knob 91 are released, and spring force will push the locking cage 23 out of engagement with the chuck sleeve 37. The drill is then then ready to use.

In order to return a tool bit to storage the cable assembly is pushed through an empty magazine chamber to its fully forward position in which the chuck sleeve 37 is held against rotation, and the tip 97 magnetically engages the rear end of the tool bit. The motor 17 is then driven in reverse so as to turn the inner chuck sleeve 29 in the direction causing the chuck jaws to loosen. The cable assembly can then be retracted so as to pull the magnetically held tool bit into the magazine chamber. The magnetic tip 97 will separate from the tool bit when the tool bit abuts the narrowed portion 75 on the chamber.

While a certain preferred embodiment of the invention has been described, it should be understood that the invention is not limited thereto since there are many variations that will o be readily apparent to those skilled in the art. Thus it is intended that the invention be given the broadest possible interpretation within the terms of the claims which follow.

What is claimed is:

1. A multiple bit power drill, including:
   a. housing having a handle, a central portion and a forward part;
   b. chuck assembly, rotatably mounted to said housing forward part and having a central bore for receiving a tool bit element, and including bit-grasping jaws and a rotatable sleeve for controlling said jaws;
   c. motor means mounted in said central portion for reversibly driving said chuck assembly;
   d. slip clutch means disposed in drive relationship between said motor and said chuck assembly, and adapted to slip in its drive relationship when a predetermined amount of torque is experienced;
   e. cylindrical magazine mounted in said central portion for rotation about a longitudinal axis, and having a plurality of longitudinal chambers therethrough, each said chambers adapted to mount a bit element, said magazine being rotatable to align each of said magazine chambers with the central bore of said chuck assembly;
   f. locking means for releasably engaging said chuck sleeve to hold said sleeve against rotation; and
   g. means for ejecting a bit element from a magazine chamber and positioning said bit in said chuck bore, and for releasably engaging said locking means, and for moving a bit element from said chuck bore to a magazine chamber, said ejecting means having a retracted, rearward position in which said magazine is free to rotate, and having a forward position in which said ejecting means extends through a magazine chamber to push a bit element from said magazine chamber into said chuck bore and to engage said locking means to cause said chuck sleeve to be held against rotation, whereby said motor can be energized to rotate said chuck assembly in a first direction causing said jaws to clamp said bit element, and in a reverse direction to cause said jaws to unclasp said bit element.

2. A drill as defined in claim 1 wherein said ejecting means has a rearward portion adapted to be grasped by hand, and a forward portion that has a first, bit element-engaging head, and a second head for engaging said locking means.

3. A drill as defined in claim 2 wherein said first head is magnetic.

4. A drill as defined in claim 3 wherein said ejecting means comprises a flexible cable, and said handle has a channel that is adapted to slidably mount said cable.

5. A drill as defined in claim 4 wherein said channel has a longitudinally extending slot, and a push knob is attached through said slot to the rear portion of said cable.

6. A drill as defined in claim 5 wherein said cable forward portion includes a stop member affixed and spaced a distance behind said magnetic head, and wherein said second head is slidably mounted to said cable for movement between said magnetic head and said stop member.

7. A drill as defined in claim 2 wherein said locking means is axially slidable between a forward, sleeve-engaging position and a rearward position, and including spring means to bias said locking means in said rearward position, said locking means having a front end that is adapted to engage and hold said sleeve against rotation, and a rear end that is adapted to be engaged by said second element cable head.

8. A drill as defined in claim 2 wherein said motor is mounted co-axially with respect to said magazine.

9. A drill as defined in claim 8 wherein said magazine has a central cylindrical cavity that mounts said motor.

10. A drill as defined in claim 9 wherein said motor is electrically powered.

11. A drill as defined in claim 2 wherein each of said magazine chambers has a rear end and a forward-facing annular ledge adjoining said chamber rear end, whereby said ledge is adapted to abut said bit element to prevent rearward movement of said bit element from said chamber.

12. A power drill as defined in claim 5 wherein said handle has a rear wall, and wherein said channel slot opens to said rear wall.

13. A power drill as defined in claim 7 wherein said chuck sleeve has a rearward end having a locking groove, and said locking means front end has a projection that is adapted to releasably engage said groove to hold said sleeve against rotation.

14. A method for selecting and mounting a bit element in a multiple bit power drill that has a housing having a handle, a central portion, and a forward part; a chuck assembly, rotatably mounted to said housing forward part and having a central bore for receiving a tool bit element, and including bit-grasping jaws and a rotatable sleeve for controlling said jaws; motor means mounted in said central portion for reversibly driving said chuck assembly; slip clutch means disposed in drive relationship between said motor and said chuck assembly, and adapted to slip in its drive relationship when a predetermined amount of torque is experienced; and a cylindrical magazine mounted in said central portion for rotation about a longitudinal axis, and having a plurality of longitudinal chambers therethrough, each of said chambers adapted to mount a bit element, said magazine being rotatable to align each of said magazine chambers with the central bore of said chuck assembly; said method including the steps of:

a) providing bit-handling means for physically and magnetically engaging the rear end of a bit element;

b) rotating said magazine to bring a chamber containing a selected bit element into alignment with said chuck assembly central bore;

c) engaging said selected bit element with said bit-handling means and extending said bit-handling means forwardly through said chamber so as to urge said bit element from said chamber to said chuck assembly bore; and d) holding said chuck assembly sleeve against rotation and energizing said motor means to drive said assembly in rotation to cause said jaws to grasp and hold said bit element.

15. A method for dismounting and storing a bit element in a multiple bit power drill that has a housing having a handle, a central portion, and a forward part; a chuck assembly, rotatably mounted to said housing forward part and having a central bore for receiving a tool bit element, and including bit-grasping jaws and a rotatable sleeve for controlling said jaws; motor means mounted in said central portion for reversibly driving said chuck assembly; slip clutch means disposed in drive relationship between said motor and said chuck assembly, and adapted to slip in its drive relationship when a predetermined amount of torque is experienced; and a cylindrical magazine mounted in said central portion for rotation about a longitudinal axis, and having a plurality of longitudinal chambers therethrough, each of said chambers adapted to mount a bit element, said magazine being rotatable to align each of said magazine chambers with the central bore of said chuck assembly; said method including the steps of:

a) providing bit-handling means for physically and magnetically engaging the rear end of a bit element;

b) aligning an empty one of said chambers with said chuck assembly bore and extending said bit-handling means through said empty chamber and into magnetic engagement with the rear end of a bit element mounted in said chuck assembly;

c) holding said chuck assembly sleeve against rotation and energizing said motor means to drive said assembly in a predetermined direction of rotation to cause said jaws to release said bit element; and d) withdrawing said bit-handling means rearwardly to pull said bit element from said chuck bore to said chamber.

16. A multiple bit power drill, including:

a) housing having a handle, a central portion and a forward part;

b) check assembly, rotatably mounted to said housing forward part and having a central bore for receiving a tool bit element, and including bit-grasping jaws and a rotatable sleeve for controlling said jaws;

c) motor means mounted said central portion for reversibly driving said chuck assembly;

d) slip clutch means disposed in drive relationship between said motor and said chuck assembly, and adapted to slip in its drive relationship when a predetermined amount of torque is experienced;

e) cylindrical magazine mounted in said central portion for rotation about a longitudinal axis, and having a plurality of longitudinal chambers therethrough, each said chambers adapted to mount a bit element, said magazine being rotatable to align each of said magazine chambers with the central bore of said chuck assembly;

f) locking means for releasably engaging said chuck sleeve to hold said sleeve against rotation; and g) means for ejecting a bit element form a magazine chamber and positioning said bit in said chuck bore, and for releasably engaging said locking means, and for moving a bit element from said chuck bore to a magazine chamber, said ejecting means comprising a flexible cable having a rearward portion adapted to be grasped by hand, and a forward portion that has a magnetic bit element-engaging head and a second head for engaging said locking means, said ejecting means having a retracted, rearward position in which said magazine is free to rotate, and having a forward position in which said ejecting means extends through a magazine chamber to push a bit element from said magazine bore into said chuck bore and to engage said locking means to cause said chuck sleeve to be held against rotation, hereby said motor can be energized to rotate said check assembly in a first direction causing said jaws to clamp said bit element, and in a reverse direction to cause said jaws to unclasp said bit element.

17. Method as defined in claim 14 wherein the step of holding said chuck assembly sleeve against rotation includes releasably engaging said sleeve by locking means mounted within said housing.

18. Method as defined in claim 15 wherein the step of holding said chuck assembly sleeve against rotation includes releasably engaging said sleeve by locking means mounted within said housing.

* * * * *